A. SPEIGHT.
MEANS FOR RAISING AND LOWERING VEHICLE AND OTHER WINDOWS.
APPLICATION FILED JAN. 29, 1916.
1,204,201.
Patented Nov. 7, 1916.
2 SHEETS—SHEET 1.
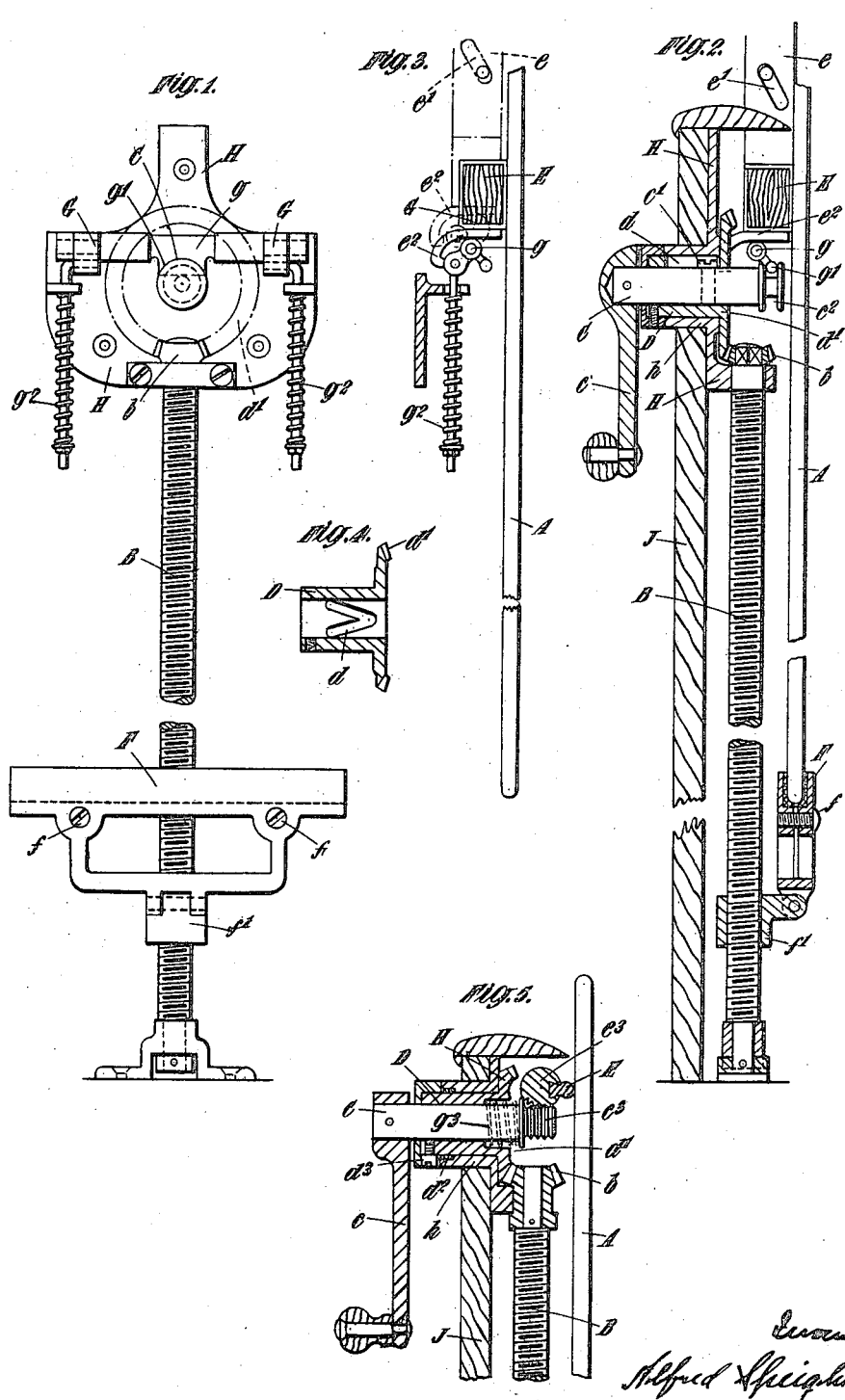

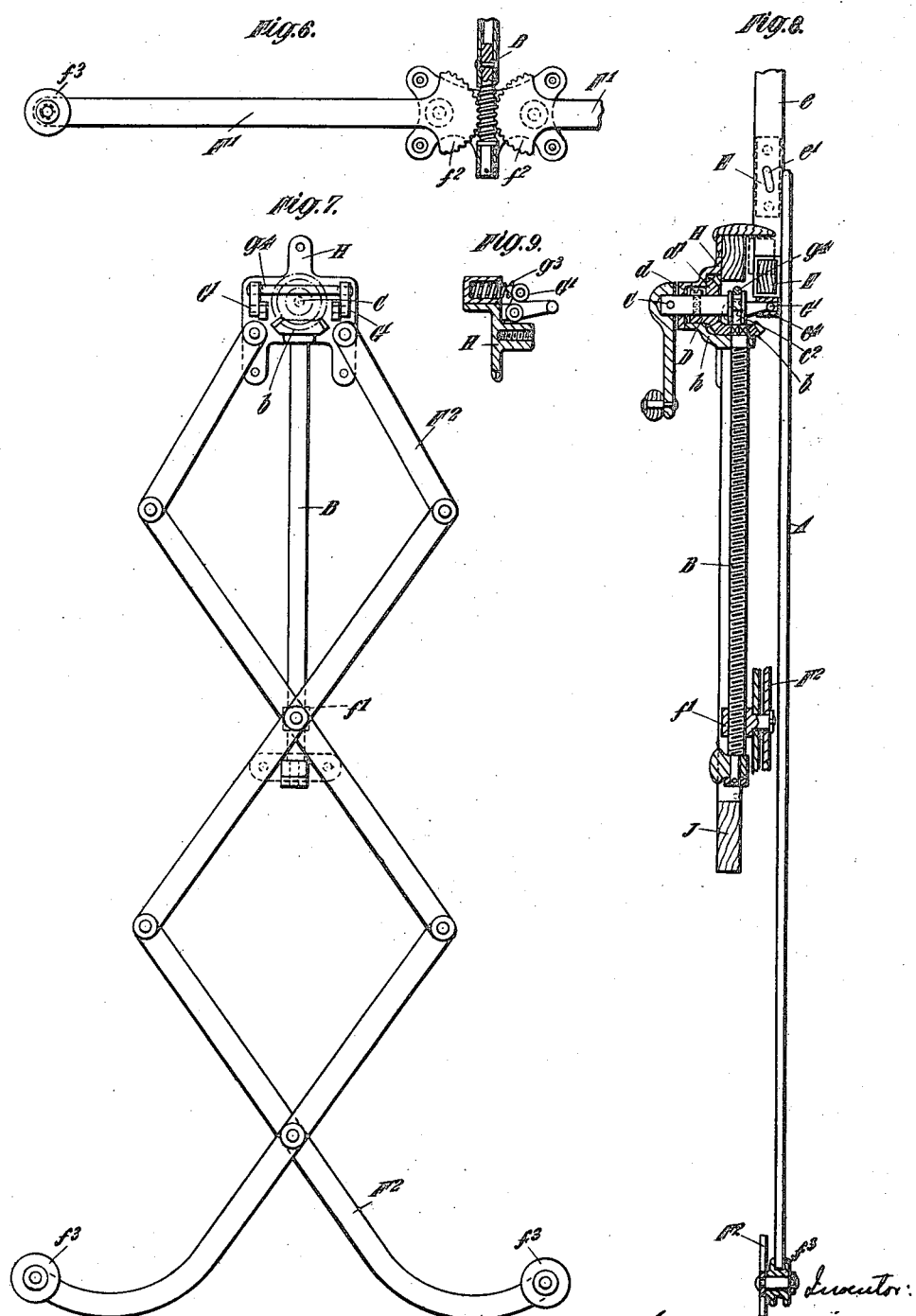

UNITED STATES PATENT OFFICE.

ALFRED SPEIGHT, OF WIMBLEDON PARK, ENGLAND, ASSIGNOR OF ONE-HALF TO JOHN HALL & SONS (BRISTOL & LONDON) LIMITED, OF BRISTOL, ENGLAND.

MEANS FOR RAISING AND LOWERING VEHICLE AND OTHER WINDOWS.

1,204,201.  Specification of Letters Patent.  Patented Nov. 7, 1916.

Application filed January 29, 1916. Serial No. 75,095.

*To all whom it may concern:*

Be it known that I, ALFRED SPEIGHT, a subject of the King of Great Britain, residing at 61 Arthur road, Wimbledon Park, in the county of Surrey, England, have invented certain new and useful Improvements in Means for Raising and Lowering Vehicle and other Windows, of which the following is a specification.

This invention relates to improved means for raising and lowering vehicle and other windows and more particularly the windows of motor vehicles which are provided with gripping or locking devices fixing them in closed or open position.

According to my invention the mechanism employed to raise or lower the window on starting its movement automatically releases the window locking or gripping device, so that the operator effects release without requiring to manipulate any special mechanism for that purpose, the locking or gripping device automatically returning into operative position on the release of the raising and lowering mechanism.

In the construction I prefer to employ the window (which may be of the frameless type) is operated by a vertical screw, this screw being turned through bevel gearing by a handle or small wheel on a horizontal winding spindle adapted to slide in a sleeve belonging to one of the bevel wheels. By the aid of a V-shaped slot or groove and pin or like connection, when the handle is turned in either direction to raise or lower the window the spindle moves axially and the movement thus given is employed to raise the window locking or gripping device so as to release the window and allow it to rise or fall according to the direction in which the handle is turned.

In order that the said invention may be clearly understood and readily carried into effect, I will describe the same more fully with reference to the accompanying drawings, in which:—

Figure 1 is a front elevation and Fig. 2 a vertical section of one construction embodying my invention. Figs. 3 and 4 are sectional detail views respectively of the releasing device and of the slotted sleeve. Fig. 5 shows a modified construction in vertical section. Fig. 6 illustrates a modification of the window raising mechanism; and Figs. 7, 8 and 9 show a further modification of both the releasing and the window lifting devices.

A is the window, which may be of the frameless type frequently used in motor cars.

B is the vertical screw or lifting rod.

C is the winding spindle operating the screw B through bevel gearing and having the handle $c$ for winding purposes.

D is a sleeve within which the spindle C can turn and slide.

E is a locking device in the form of a fillet adapted to bear upon the window surface.

Referring to the construction shown in Figs. 1 to 4 the sleeve D is formed with the V shaped slot $d$, the apex of which is toward the window and a pin $c'$ on the winding spindle C projects into this slot, normally lying in the apex of the slot and acting to turn the sleeve D only after a combined turning and sliding movement of the spindle has brought the pin to either end of the slot $d$. A bevel wheel $d'$ on the end of the sleeve D engages a bevel wheel $b$ on the upper end of the window lifting screw B, so that when the sleeve D turns it raises or lowers the window according to the direction of rotation.

The screw D carries a window support F in the form of a split fork with channeled cross bar receiving the lower edge of the window. The channeled bar is caused to grip the window edge through soft lining material by the aid of the binding screws $f$ which bind the split members to form a clamp, as shown in Fig. 2. The support is pivoted to a nut $f'$ on the screw B and as the latter is turned the nut and support are raised or lowered, moving the window with them. The clamping device is provided to prevent danger of the window sticking accidentally, but usually it would drop by its own weight when the locking device is released as hereinafter described.

The locking fillet E is carried by side bars $e$ each having a slot and pin connection $e'$ to the window frame. The fillet is operated by cams G on a cam spindle $g$ having an arm $g'$ engaging in an annular channel $c^2$ at the end of the winding spindle C and controlled by springs $g^2$ which serve automatically to return the fillet to locking position and the winding spindle C to its normal position with the pin $c'$ at the apex of the slot $d$. To return the fillet E a nose on each of the cams G engages the lower edge of a plate $e^2$ on the bottom of the fillet so that the latter is pulled down on the return of the cam to normal position. The return of the spindle C is effected through the arm $g'$ and channel $c^2$.

A plate H with hollow boss $h$ fixed on the window casing J, carries the winding spindle, sleeve and gearing and the upper end of the screw B.

The operation of the mechanism is as follows:—In the normal position shown in Figs. 1 and 2 the window is held positively in place by the pressure of the locking fillet E and the handle and winding spindle are in forward position with the pin $c'$ at the apex of the slot $d$. If the window is to be raised or lowered the handle $c$ is turned to the right or left, either movement in the first place causing a spiral displacement of the spindle without operation of the winding screw B. The axial movement of the spindle C operates the arm $g'$ of the cam spindle $g$, turning the spindle against the pressure of the springs $g^2$ and causing the cams G to raise the fillet E as shown in chain lines in Fig. 3. The window is thus released and is free to move up or down on further rotation of the winding spindle, which now turns the sleeve D, with bevel gearing $d'$, $b$ acting on the winding screw B, and through this and the nut $f'$ on the support F. Immediately on release of the handle $c$ the springs $g^2$ return the locking fillet and winding spindle to normal position.

It is to be understood that the slotted sleeve is only a typical device for giving the lost motion action to the winding spindle. Any suitable sliding surfaces between the spindle and lifting mechanism may be employed to give the desired action.

In Fig. 5 a modification of the device is shown in which the locking fillet E is carried by a rotating bar or spindle $e^3$ with a toothed segment engaging a circular rack $c^3$ on the end of the spindle C. The axial withdrawing movement of the spindle C turns the fillet bar so as to move the fillet away from contact with the window. In place of the two springs $g^2$ acting on a cam spindle as in the arrangement first described a single spring $g^3$ on the spindle C serves the same purpose of returning the spindle and fillet to normal position on release of the winding handle $c$. A small spring $d^2$ between the cap $d^3$ on the sleeve D and the fixed boss or sleeve $h$ prevents any rattling of the parts due to vibration. The construction shown in Fig. 5 possesses certain advantages of simplicity and economy of space as compared with the device first described.

Fig. 6 shows a modification of the lifting device which can be used with any convenient form of winding and releasing mechanism. In this modification the support is in the form of a pair of levers F' with toothed segments $f^2$ engaging a short screwed portion of the winding rod B, a roller $f^3$ at the outer end of each lever supporting the lower edge of the window. Owing to the leverage the movement of the screw B is considerably reduced and lower gear may be employed between the screw and the winding spindle to compensate for the smaller movement of the screw.

In Figs. 7, 8 and 9 the window support is in the form of lazy tongs $F^2$, with window supporting rollers $f^3$ at the ends of the lower levers. This arrangement permits of the use of a shorter screw B, as the lazy tongs project below the screw. A slight modification of the releasing device shown in Figs. 1 to 4 is also illustrated, in which the vertical springs $g^2$ are replaced by short horizontal springs $g^3$ each controlling a bell crank lever G' which takes the place of the cam G of the former arrangement and engages in the recessed plate $e^4$ on the fillet E, and also, through a cross bar $g^4$, engages the recessed part $c^2$ of the winding spindle C. The general operation of the mechanism is similar to that described for Figs. 1 to 4, but owing to the shorter screw B required for the lazy tongs device the bevel wheels $d'$, $b$ give a lower speed ratio than is provided for in the first construction.

What I claim and desire to secure by Letters Patent of the United States is:—

1. In window operating apparatus, a spring controlled window gripping device, a winding spindle adapted to raise the said device against the action of its spring, window raising and lowering mechanism operated by the winding spindle, and a lost motion device between the said mechanism and the winding spindle.

2. In window operating apparatus, a spring-controlled window gripping device, raising and lowering mechanism, a winding spindle operating the said mechanism, means for giving the said spindle a limited axial movement at the beginning and end of its rotation, and a connection from the spindle to the said window gripping device, adapted to release the latter by the axial movement of the spindle.

3. In window operating apparatus, a vertical screw supporting the window, a sleeve geared to the said screw, a winding spindle adapted to slide and to turn to a limited extent in the said sleeve under the control of V-shaped surfaces, and a window retaining device released by the spindle on its sliding movement.

4. In window operating apparatus, a vertical screw, a window support mounted on the screw, a winding spindle actuating the said screw on turning through a lost motion connection, a window gripping fillet adapted to press against the window surface under spring control and a connection from the winding spindle to the fillet, adapted to raise the latter from the window during the lost motion of the spindle.

5. In window operating apparatus, a vertical screw, a window support carried by the screw, a winding spindle actuating the said screw, means for giving the said spindle an axial movement at the beginning and end of its rotation, a window gripping fillet and a lever connection between the fillet and winding spindle operated only by the axial movement of the latter to release the fillet.

6. In window operating apparatus, a vertical screw supporting the window, a sleeve geared to the said screw and provided with a V-shaped slot, a winding spindle in the said sleeve and connected to it by a pin sliding in the said slot and adapted to give an axial movement to the spindle at the beginning and end of its winding movement, a window retaining device and means for actuating the said device on the axial movement of the winding spindle.

ALFRED SPEIGHT.